(12) United States Patent
Vitner et al.

(10) Patent No.: US 7,763,232 B2
(45) Date of Patent: Jul. 27, 2010

(54) METHODS FOR PRODUCTION OF TITANIUM OXIDE PARTICLES, AND PARTICLES AND PREPARATIONS PRODUCED THEREBY

(75) Inventors: Asher Vitner, Jerusalem (IL); Aharon Eyal, Jerusalem (IL)

(73) Assignee: Joma International AS, Royrvik (NO)

( * ) Notice: Subject to any disclaimer, the term of this patent is extended or adjusted under 35 U.S.C. 154(b) by 121 days.

(21) Appl. No.: 12/096,143

(22) PCT Filed: Dec. 21, 2006

(86) PCT No.: PCT/IL2006/001468

§ 371 (c)(1),
(2), (4) Date: Jun. 4, 2008

(87) PCT Pub. No.: WO2007/074436

PCT Pub. Date: Jul. 5, 2007

(65) Prior Publication Data

US 2008/0299036 A1 Dec. 4, 2008

(30) Foreign Application Priority Data

Dec. 27, 2005 (IL) .................................. 172836

(51) Int. Cl.
*C01G 23/047* (2006.01)
*C01G 23/053* (2006.01)
*C01G 23/04* (2006.01)

(52) U.S. Cl. ..................... 423/610; 423/611; 423/612; 423/615; 423/616; 423/608

(58) Field of Classification Search ............... 423/610, 423/611, 612, 615, 616
See application file for complete search history.

(56) References Cited

U.S. PATENT DOCUMENTS 6,074,472 A 6/2000 Jachow et al.

FOREIGN PATENT DOCUMENTS

| DE | 19530574 | 2/1997 |
| DE | 10223567 | 12/2003 |
| EP | 0 722 905 | 7/1996 |
| EP | 0 774 443 | 5/1997 |
| SU | 882932 | 11/1981 |
| WO | WO 02/20407 | 3/2002 |

OTHER PUBLICATIONS

Wei-Lin et al., "Formation of the rutile TiO2 under ultrasonic irradiation." J. Mater. Sci. 39 (2004), pp. 3265-3266.*
Qinghong Zhang, et al., Effect of Hydrolysis Conditions on Morphology . . . , Journal of the European Ceramic Society, vol. 20, 99. 2153-2158, 2000.
Tadafumi Adschiri, et al, Rapid and Continuous Hydrothermal . . . , Communications of the American Ceramic Society, vol. 75, No. 4, 1992.

* cited by examiner

Primary Examiner—Timothy C Vanoy
Assistant Examiner—Daniel Berns
(74) Attorney, Agent, or Firm—Lucas & Mercanti, LLP

(57) ABSTRACT

The invention provides a method for the formation of small-size titanium oxide particles, comprising the steps of a) preparing a starting aqueous solution comprising at least one of titanic ions and complexes thereof, at a concentration of at least 0.1% w/w titanium; b) maintaining the solution at a temperature lower than 70° C. for a retention time in which hydrolysis takes place, the extent of the hydrolysis being sufficient to produce O.i mmol protons per mmol of titanium present in solution, wherein the time does not exceed 14 days, to form a system containing a retained solution; and c) adjusting the conditions in the system by at least one of the steps of: i) heating the retained solution to elevate the temperature thereof by at least 1° C.; ii) changing the pH of the retained solution by at least 0.1 units; and iii) diluting the retained solution by at least 20% whereby there are formed particles, wherein the majority of the particles formed are between about 2 nm and about 500 nm in size.

25 Claims, No Drawings

METHODS FOR PRODUCTION OF TITANIUM OXIDE PARTICLES, AND PARTICLES AND PREPARATIONS PRODUCED THEREBY

The present invention relates to a method for producing titanium oxide nano-particles and more particularly, to a method for producing titanium oxide particles of desired particle size, particle size distribution and habit in an industrially and economically useful manner. In the present invention, the term titanium oxide means and includes titanium oxides of the formula TixOy (e.g. TiO, $TiO_2$, $Ti_2O_3$ and $Ti_3O_5$), titanium hydroxy-oxides of the formula Tip(OH)qOr (e.g. $Ti(OH)_4$), titanic acid, various hydration forms of those and compositions wherein those are major components, wherein x, y, p, q, r are each whole integers.

BACKGROUND ART

Presently titanium oxides are widely used in industry for various applications: Paint pigment, opacifying agent, welding rod fluxes, optical coatings, as a catalyst (for example in NOx absorption from flow gases), ceramic finish coat, plastics elastomers, printing inks, roofing granules, glass, and in glazes. The forecasted growth through 2006 is 2.0% per year.

Titanium oxides have at least four crystal forms: titanic acid, anatase, brookite, and rutile. Of these, the rutile form has the greatest density, hardness, and refractive index Titanium oxide crystals are characterized by the variety of sizes, colors, densities, porosities, surface areas and shapes. These parameters have great impact on their use and performance. The final product properties depend on the procedures developed for precipitation and aging of the products. There is great interest in a technique for the production of titanium oxide particles with advanced properties, such as nano-crystallinity, narrow particle size distribution, preparation of metastable phases etc.

As presented in U.S. Pat. Nos. 6,830,742 and 6,653,356 titanium oxide is generally produced using a liquid phase process, where titanium tetrachloride or titanyl sulfate is used as a starting material which is hydrolyzed in a hydrophilic solvent or a vapor phase process, in which a volatile starting material such as titanium tetrachloride is vaporized, and then reacted in the gas state with an oxidizing gas such as oxygen or steam, at a high temperature.

In general, the titanium oxide powder produced by the liquid or vapor phase process disadvantageously undergoes heavy aggregation and wide range of particle size distribution. In the case of titanium oxide produced by the vapor phase process, the same problems that are occurring through production via the liquid phase process, are occurring as well in this process. That is, although ultra fine particulates of titanium oxide may be obtained through the conventional vapor phase process, only particulates of titanium oxide that have undergone grain growth can be obtained. Therefore, there is great interest in a technique for the production of titanium oxide materials with advanced properties, such as nano-crystallinity, narrow particle size distribution, preparation of meta-stable phases etc.

The main objective of the present invention is to provide an industrial and economical process for the production of titanium oxide particles characterized by a desired particle size, size distribution and crystal habit.

Another objective of the present invention is to provide an industrial and economical process for the production of titanium oxide particles characterized by a low hydration level.

Another object of the present invention is to provide an industrial and economical process for the production of titanium oxide particles characterized by high porosity and by the required morphology and habit.

DISCLOSURE OF THE INVENTION

With this state of the art in mind, there is now provided, according to the present invention, a method for producing titanium oxide particles in an aqueous solution, which comprises maintaining an aqueous titanium salt solution defined as the starting aqueous solution at a temperature lower than 70° C. for a time sufficient to reduce the acidity of solution due to hydrolysis. The resulting solution defined as the retained solution is then subjected to a modification in temperature and/or dilution and/or addition of a reagent, thus modifying the pH of the solution to form a modified system. The preferred modification mode of said parameters is at a high rate.

In a second aspect of the present invention, there is provided raw material for producing other titanium oxide particles by conventional methods such as heat-transformation of the obtained particles, calcination or ripening.

More specifically according to the present invention there is now provided a method for the formation of small-size titanium oxide particles, comprising the steps of
   a) preparing a starting aqueous solution comprising at least one of titanic ions and complexes thereof, at a concentration of at least 0.1% w/w titanium;
   b) maintaining said solution at a temperature lower than 70° C. for a retention time in which hydrolysis takes place, the extent of said hydrolysis being sufficient to produce 0.1 mmol protons per mmol of titanium present in solution, wherein said time does not exceed 14 days, to form a system containing a retained solution; and
   c) adjusting the conditions in said system by at least one of the steps of:
      i) heating the retained solution to elevate the temperature thereof by at least 1° C.;
      ii) Changing the pH of the retained solution by at least 0.1 units; and
      iii) diluting the retained solution by at least 20%
      whereby there are formed particles, wherein the majority of the particles formed are between about 2 nm and about 500 nm in size.

The term titanium oxide as used in the present specification refers to $TiO_2$ titanium hydroxides like titanium hydroxide (II), $(Ti(OH)_2)$; titanium hydroxide (III), $(Ti(OH)_3)$; titanium hydroxide (IV), $(Ti(OH)_4)$; titanium oxyhydroxide, $(TiO(OH)_2)$; and titanic acids such as alpha.-titanic acid (ortho-titanic acid $(H_4TiO_4)$), .beta.-titanic acid (meta-titanic acid $(H_2TiO_3)$) and combinations thereof.

In preferred embodiments of the present invention said solution is kept at said modified conditions for at least 0.5 minute.

Preferably said modification of conditions is carried out over a period of up to 2 hours.

In preferred embodiments of the present invention, said process produces at least 50 kilograms of particles per hour.

Preferably said modification of conditions is carried out at a pressure of up to 100 atmospheres.

In preferred embodiments of the present invention said method is further characterized in that the majority of the formed particles have a degree of crystallinity of more than 50%.

Preferably said method is further characterized in that the size ratio between the smallest and largest particles of the mean 50% (by weight) of the formed particles is less than about 10, in especially preferred embodiments is less than about 5.

The term mean 50% (by weight), as used in the present specification refers to the 50% (by weight) of the particles, including 25% (by weight) of the particles which have a size that is larger than the mean size of the particles and 25% of the particles which have a size that is smaller than the mean size of the particles, whereas the larger 25% and the smaller 25% of the particles are closest in their size to the mean size in a diagram that presents the size distribution of the formed particles.

Preferably said method is further characterized in that the majority of the formed particles are of a configuration other than elongated.

In preferred embodiments of the present invention said method is further characterized in that the majority of the formed particles have a configuration wherein the ratio between one dimension and any other dimension is less than about 3.

In other preferred embodiments of the present invention the majority of the formed particles are of an elongated configuration.

Preferably the majority of the formed particles have a surface area of at least 30 $m^2/gr$.

Preferably the majority of the formed particles have a surface area of at least 100 $m^2/gr$.

In especially preferred embodiments of the present invention said method further comprises the step of calcinations, i.e., heating said formed particles to a temperature in a range of between about 90° C. and about 900° C. to form dehydrated particles.

In another preferred embodiment, the calcination step involves the dehydration of the produced particles.

In said preferred embodiments, said method preferably further comprises the step of removing part of the water in said particle suspension after said modifying of condition step (and prior to, simultaneously with or after said dehydration).

In said preferred embodiments said dehydration is preferably conducted under super-atmospheric pressure.

In said preferred embodiments the temperature of said particle suspension is preferably elevated to said dehydration temperature over a period of up to 4 hours.

In said especially preferred embodiments the majority of the dehydrated particles are preferably of a configuration other than elongated.

In said especially preferred embodiments the majority of the dehydrated particles preferably have a surface area of at least 30 $m^2/gr$.

Preferably said particles are selected from the group consisting of anatase, rutile or brookite.

Especially preferred are particles having the formula of $TiO_2$.

Also preferred are particles having the formula $Ti(OH)_4$.

Preferably the pH of said aqueous solution is between about 0 and about 7 during at least a fraction of said adjusting step.

Especially preferred is a method wherein the pH of said aqueous solution is between about 0.5 and about 2 during at least a fraction of said adjusting step.

In preferred embodiments of the present invention said preparation of an aqueous solution involves dissolution of an titanium compound, addition of a base and acidulation of an titanium salt solution.

In said preferred embodiments said titanium compound is preferably selected from the group consisting of titanium salts, titanium oxides, titanium hydroxides, titanium minerals and combinations thereof. In the present invention the term titanium complexes includes titanium salts, complexes and titanium hydroxides Preferably said titanium compound is selected from the group consisting of titanium oxides, titanium hydroxides, minerals containing the same and mixtures thereof, and said compound is dissolved in an acidic solution comprising an acid selected from the group consisting of sulfuric acid, nitric acid, hydrochloric acid, phosphoric acid, their acidic salts and combinations thereof.

In preferred embodiments of the present invention said prepared aqueous solution comprises an anion selected from the group consisting of sulfate, chloride, nitrate, phosphate, an organic acid and mixtures thereof.

In preferred embodiments of the present invention said modification comprises at least two heating steps.

In said preferred modification step at least one heating step is preferably conducted by contacting with a warmer stream selected from a group consisting of hot aqueous solutions, hot gases and steam.

In preferred embodiments said method preferably further comprises grinding formed particles.

In preferred embodiments said method preferably further comprises screening formed particles.

The present invention is also directed to titanium oxide particles whenever formed according to the above-defined methods and products of their conversion.

The present invention is further directed to a preparation comprising said particles.

In preferred embodiments of said preparation said particles are preferably dispersed in a liquid, supported on a solid compound or agglomerated to larger particles.

In another aspect of the present invention there is provided a process for the production of a preparation as defined above comprising steps selected from the group consisting of dispersing said particles, addition of a support, heat treatment, mixing, water evaporation spray drying, thermal spraying and combinations thereof.

In especially preferred embodiments of the present invention said particles and preparations are used in the manufacture of paint.

In other preferred embodiments of the present invention said particles and preparations are used in the manufacture of a catalyst.

In another preferred embodiment of the present invention there is now provided a method for the formation of small-size titanium oxide particles, comprising the steps of a) preparing a starting aqueous solution comprising at least one of titanic ions and complexes thereof, at a concentration of at least 0.1% w/w titanium, which solution has a pH lower than 2;

b) preparing a modifying aqueous solution;

c) contacting the starting solution with the modifying solution in a continuous mode in a mixing chamber to form a modified system;

d) removing the modified system from the mixing chamber in a plug-flow mode; and which method is characterized in that:

i. the residence time in the mixing chamber is less than about 5 minutes;

ii. there are formed particles or aggregates thereof, wherein the majority of the particles formed are between about 2 nm and about 500 nm in size; and iii. the formed particles comprise titanic acid or $TiO_2$ or a combination thereof The conditions in said system are adjusted by the modifying solution by at least one of the conditions of:
a) heating said starting aqueous solution by at least 10° C.,
b) changing the pH of said starting aqueous solution by at least 0.1 units; and
c) diluting the starting aqueous solution by at least 20%
or a combination thereof, wherein said modified system is maintained at said adjusting conditions for at least 0.5 minutes.

In especially preferred embodiments of the present invention the modified system stays in the mixing chamber for less than 5 seconds and in a more preferred embodiment the modified system stays in the mixing chamber for less than 0.5 second.

In preferred embodiments of the present invention, the mixing in the mixing chamber is carried out using the flow rate of the entering solution or by using a mechanical mode of mixing or another mode of mixing.

In preferred embodiments of the present invention the modified system exits the mixing chamber in a plug flow mode. In a more preferred embodiment the plug flow continues for more then 0.1 second and in a most preferred embodiment the plug flow continues for more then 5 seconds.

In preferred embodiments of the present invention the solution exiting the plug flow enters into a vessel. In a more preferred embodiment of the present invention the solution in the vessel is mixed.

DETAILED DESCRIPTION OF THE INVENTION

The present invention will now be described in detail below.

First, the process for producing titanium oxide particles according to the present invention is described.

The starting aqueous titanium salt solution used in the present invention is preferably an aqueous titanium salt solution comprising titanic ions or their complexes at a concentration of at least 0.1% w/w titanium.

According to a preferred embodiment, the titanium w/w concentration in the starting solution is at least 2%, more preferably at least 5%, most preferably at least 10%. There is no upper limit to the concentration of the starting solution. Yet, according to a preferred embodiment, the concentration is below the saturation level. High viscosity is not desired according to another preferred embodiment. According to a preferred embodiment, OH/Ti ratio in the solution is smaller than 2. According to a preferred embodiment, the temperature of the prepared starting solution is less than 70° C.

Any source of titanium is suitable for preparing the starting solution of the present invention, including titanium containing ores, fractions of such ores, products of their processing, titanium salts or titanium containing solutions such as aqueous solution exiting titanium containing ores.

According to a preferred embodiment, step (b) is conducted shortly after both the desired concentration and pH are achieved. According to another preferred embodiment, the solution used in step (b) is prepared within a short time and does not contain titanic ions or their complexes, which were prepared at different times and then mixed together. For a similar reason, extended preparation time is not desired. According to a preferred embodiment, preparation time is shorter than 20 hours, preferably shorter than 10 hours, most preferably shorter than 2 hours. In cases wherein an older solution exists (e.g. a recycled solution) and is to be mixed with a fresh solution to form the starting solution, the older solution is first acid treated, as described hereinafter.

The freshly prepared titanic salt solution may contain any anion, including chloride, sulfate, nitrate phosphate, carboxylate, organic acid anions, and various mixtures thereof. According to a preferred embodiment, the freshly prepared solution comprises titanic sulfate. According to another preferred embodiment, the salt is of an organic acid.

A freshly prepared salt solution for use in the process of the present invention may be a solution that was produced in natural conditions, (such as solutions exiting mines with titanium containing ores) or a solution that was prepared by artificial methods including chemical or biological oxidations. Such a solution could be prepared by various methods or their combinations, including dissolution of titanic salts, dissolution of titanium salts, dissolution of double salts, dissolution of titanium oxide-containing ores in an acidic solution, dissolution of scrap titanium in oxidizing solutions, such as solutions of titanic salt, nitric acid, etc., leaching of titanium-containing minerals, such as anatase, rutile or brookite, etc.

Preparation of the aqueous solution is conducted in a single step, according to a preferred embodiment. According to an alternative embodiment, the preparation comprises two or more steps. According to another embodiment, a concentrated solution of titanic salt is prepared, e.g. by dissolution of a salt in water or in an aqueous solution. While momentarily and/or locally, during the dissolution, the required pH and concentration of the starting solution are reached, typically the pH of the formed concentrated solution after at least partial homogenization, is lower than desired for the starting solution. According to a preferred embodiment, such momentary reaching of the desired conditions is not considered preparation of the starting solution. The pH of the concentrated solution is then brought to the desired level by any suitable means, such as removal of an acid, addition and/or increasing the concentration of a basic compound, or a combination thereof. The formation of the starting solution in this case is considered the adjustment of the pH to the selected range, according to a preferred embodiment, and the pH of the starting solution is the one obtained after at least partial homogenization, according to another preferred embodiment. According to still another preferred embodiment, a concentrated solution is prepared and the pH is adjusted to a level that is somewhat lower than desired. The starting solution is then prepared by dilution of the solution, which increases the pH to the desired level. Here again, the pH of the starting solution is the one obtained after at least partial homogenization, according to a preferred embodiment. The same is true for other methods of multi-stage preparation of the starting solution, as e.g. in the case of forming a solution of a titanic salt.

According to a preferred embodiment, the starting solution is freshly prepared. According to another preferred embodiment, the solution does not comprise ions and/or complexes prepared at different times, as in the case of mixing a recycled solution with a freshly prepared one. At pH lower than 0, high concentration (e.g. above 10% titanium) and low temperatures (e.g. lower than 40° C.), a solution maintains its freshness for a longer time, and could serve as a stock solution, according to a preferred embodiment. At other conditions, the solution is not considered fresh after a few hours or a few days, according to another preferred embodiment. According to a preferred embodiment, freshness of the solution is regained by acid treatment. Such less fresh solution is acidulated to pH lower than 0.5, preferably to a pH lower than 0 and is preferably mixed, agitated or shaken for at least 5 min, before increasing the pH back to above 0 to reform a fresh solution. Such reformed fresh solution is mixed with other fresh solution according to a preferred embodiment.

In the next step of the process, the titanic solution is preferably retained at a temperature lower than 70° C. for a retention time that doesn't exceed 14 days. During the retention time, hydrolysis takes place. According to a preferred embodiment, the retention time is the time needed to produce at least 0.1 millimol $H^+$ (protons) in solution per one millimol of titanium. According to still another preferred embodiment, in cases wherein a base or a basic compound is added to the solution during the retention time, the retention time is the time that would have been needed to form those amounts of protons with no base addition.

According to a preferred embodiment, the retention time decreases with increasing pH of the prepared solution. Thus, e.g. at a pH lower than 1, the retention time is preferably from 20 min. to few days. At a pH of between 1.5 and 5.0, the retention time is preferably less than 1 day. In cases of varying pH during the retention time, the latter is affected by the maximal pH reached. Typically, retention time decreases with increasing temperature of the solution.

The third step needed in order to achieve the above mode of precipitation, is modifying the conditions of the solution to achieve at least one of an increase in pH and/or temperature and or dilution of the solution.

The modification of conditions is preferably done in a short time and the modified conditions are maintained for a short time. The duration at the modified conditions is less than 24 hours, according to an exemplary embodiment, preferably less than 4 hours, more preferably less than 2 hours, and most preferably less than 10 minutes. In other preferred embodiments of the present invention, the modification of conditions is conducted within 2 hours, preferably within 10 minutes, more preferably within 1 minute.

Increasing the pH in step (c) can be achieved by any known method, such as the removal of an acid, or the addition of or increasing the concentration of a basic compound. Acid removal can be conducted by known methods, such as extraction or distillation. Any basic compound could be added. According to a preferred embodiment, a basic compound is a compound that is more basic than titanic sulfate, as measured by comparing the pH of their equi-molar solutions. Thus, such a basic compound, is preferably at least one of an inorganic or organic base or precursor of a base, e.g., an oxide, hydroxide, carbonate, bicarbonate, ammonia, urea, etc. Such methods of increasing pH are also suitable for use in step (a) of preparing the starting solution. According to a preferred embodiment, basic pH is avoided through most of the process, so that during most of the duration of the pH increase in step (c), the pH is acidic, or slightly acidic.

According to another preferred embodiment the pH in step (a) is decreased by addition of an acid. According to a preferred embodiment the anion of the acid is the same anion present in the titanium salt but other anions can also be used.

According to another preferred embodiment, the solution is diluted in step (c). According to a preferred embodiment, the solution is diluted by at least 20%, more preferably by at least 100%, and most preferably by at least 200%.

According to another preferred embodiment, the temperature of the solution is increased. According to a preferred embodiment, the temperature is increased by at least 10° C., more preferably by at least 30° C., even more preferably by at least 50° C., and most preferably by at least 80° C. Temperature increase can be effected by any known method, such as contact with a hot surface, with hot liquid, with hot vapors, infra-red irradiation, microwaving or a combination thereof.

According to another preferred embodiment two or all three of the modifications are conducted sequentially or simultaneously. Thus, according to a preferred embodiment, the basic compound is added to the solution of the titanic salt after the retention time, in an aqueous solution, which also dilutes the titanic salt. According to another preferred embodiment, the solution of the titanic salt is contacted with a diluting solution comprising water and/or an aqueous solution, which is of a temperature greater than the solution of the titanic salt solution by at least 50° C. according to a first preferred embodiment, and preferably by at least 100° C. According to an alternative embodiment, the temperature of said diluting solution is between about 100° C. and 250° C., and between 150° C. and 250° C., according to another preferred embodiment. According to another preferred embodiment, the diluting solution comprises a reagent that interacts with titanic ions, their complexes and/or with particles thereof.

According to still another preferred embodiment, the titanic salt solution after the retention time, is combined in step (c) with a modifying aqueous solution comprising a solute that is more basic than the titanic salt, which modifying aqueous solution is at a temperature greater than the solution of the titanic salt. According to a preferred embodiment, the titanic salt solution and said modifying aqueous solution are mixed, e.g. mechanically, in suitable equipment that provides for strong mixing to rapidly achieve a homogenous system. In cases where the temperature of at least one of these solutions is above boiling point, the mixing equipment is preferably selected so that it withstands super-atmospheric pressure. According to a preferred embodiment, the mixing is conducted by contacting flowing titanic salt solution with flowing modifying aqueous solution, e.g. in a plug-flow mode. Preferably, the mixed stream is kept at the formed temperature or at another temperature obtained by cooling or heating for a short duration, less than 1 day according to an exemplary embodiment, preferably between 1 and 60 minutes, more preferably between 0.5 and 15 minutes.

The degree of heating, pH elevation and dilution, when conducted as a single means for modification or in combination, affects the chemical nature of the formed particles. For example, typically, the higher the temperature, the lower the degree of hydration of the particle components. The crystal form and shape are also affected.

According to a preferred embodiment, the final product oxide is formed in step (c) of the process. According to another preferred embodiment, the product of step (c) is further processed and transformed to the desired final product.

Such further processing comprises heating, according to a preferred embodiment. Preferably heating is to a temperature in the range of between about 90° C. and 900° C. According to a preferred embodiment, heating is of a solution comprising the formed particles as obtained in step (c), or after some treatment, e.g. partial or full removal of water. According to another preferred embodiment, the formed particles are first separated from the solution. The separated particles could be treated as they are, or after further treatment, e.g. washing and/or drying. Heating in solution is preferably done at a super-atmospheric pressure and in equipment suitable for such pressure. According to a preferred embodiment, an external pressure is applied. The nature of heating is also a controlling factor, so that the result of gradual heating is in some cases different from rapid heating. According to a preferred embodiment, step (c) and further heating are conducted sequentially, preferably in the same vessel.

The crystal habit of the transformed particles is of the general habit of the origin particles from which it was produced, according to a preferred embodiment. For example rod-like anatase particles can be transformed to elongated rutile particles, or in another embodiment of the present invention amorphous titanic acid particles with low particle dimension ratio can be transformed to anatase of high particle dimension ratio. In another embodiment of the present invention, agglomerates with rod-like habit or agglomerates of spherical habit can be transformed into anatase or rutile particles with rod-like habit or agglomerates with spherical habit, respectively.

As will be realized the present invention provides conditions for the production of precipitates which are easy to transform, and as well provides a transformation product with superior properties.

According to a preferred embodiment, at least one dispersant is present in at least one of the method steps. As used herein, the term dispersant means and includes dispersants, surfactants, polymers and rheological agents. Thus, a dispersant is introduced into a solution in which a titanic salt is dissolved or is to be dissolved, or is added to a precursor of the solution, such as a mineral ore, according to a preferred embodiment. According to another preferred embodiment, a dispersant is added to the solution during the retention time or after it. According to an alternative embodiment, a dispersant is added to the solution prior to the adjustment step or after such step. According to still another preferred embodiment, a dispersant is added prior to a transforming step, during such step or after it. According to another preferred embodiment, the process further comprises a step of modifying the concentration and/or the nature of the dispersant during the process, and/or adding another dispersant. According to a preferred embodiment, suitable dispersants are compounds having the ability to be adsorbed on the surface of nanoparticles and/or nuclei. Suitable dispersants include cationic polymers, anionic polymers, nonionic polymers, surfactants poly-ions and their mixtures. In the present specification the term "dispersant" relates to molecules capable of stabilizing dispersions of the formed particles, and/or modifying the mechanism of formation of the nanoparticles, and/or modifying the structure, properties and size of any species formed during the process of formation of the nanoparticles.

According to a preferred embodiment, said dispersant is selected from a group consisting of polydiallyl dimethyl ammonium chloride, sodium-carboxy methyl cellulose, poly acrylic acid salts, polyethylene glycol, and commercial dispersants such as Solsperse grade, Efka grades, Disperbyk or Byk grades, Daxad grades and Tamol grades (trade names).

According to a preferred embodiment, the process further comprises a step of ultrasound treating the solution during or after at least one of the process steps.

According to a preferred embodiment, the process further comprises a step of microwave treating the solution during or after at least one of the process steps.

According to a preferred embodiment, further processing comprises partially fusing particles to particles of greater size. According to another preferred embodiment, aggregates of the particles are mechanically treated for comminuting.

The product of the present invention, as formed in step (c) or after further transformation, is preferably small-size particles of titanium oxide. The size of the particles is in the range between 2 nm and 500 nm, according to a preferred embodiment. According to another preferred embodiment, the size distribution of the product particles is narrow so that the size ratio between the smallest and biggest particle of the mean 50% (by weight) of the formed particles is less than about 10, more preferably less than 5, most preferably less than 3.

Separate particles are formed according to a preferred embodiment. According to another embodiment, the formed particles are at least partially agglomerated.

According to a preferred embodiment, the majority of the formed particles have a degree of crystallinity of more than 50% as determined by X-ray analysis.

According to a preferred embodiment, the shape of the particles formed in step (c) or after further transformation, is elongated, such as in needles, rods or rafts.

According to another preferred embodiment, the particles are spherical or nearly spherical, so that the majority of the formed particles have a configuration wherein the ratio between one dimension and any other dimension is less than about 3.

According to a preferred embodiment, the majority of the formed particles have a surface area of at least 30 m2/gr, more preferably at least 100 m2/gr. High surface area particles of the present invention are suitable for use in catalyst preparation.

The process of the present invention is capable of forming highly pure titanium oxide from a precursor of relatively low purity, such as a titanium ore. According to a preferred embodiment, the purity of the titanium oxide product with regard to other metals intermixed therewith, is of at least 95%, more preferably at least 99%.

According to another preferred embodiment, the titanium oxide particles are doped with ions or atoms of other transition metals.

According to a preferred embodiment, the particles are obtained in a form selected from a group consisting of particles dispersed in a liquid, particles supported on a solid compound, particles agglomerated to larger particles, partially fused particles, coated particles, or a combination thereof.

The particles, their preparation and/or products of their conversion are suitable for use in many industrial applications, such as in the production of pigments, catalysts, coatings, thermal coatings, etc. The particles are used in these and other applications as such in a first embodiment. According to another preferred embodiment, said particles are further processed, and according to yet another preferred embodiment said particles are formed as part of preparing material for such application.

Many of the processes described in the literature are suited for use in laboratories, and are not highly practical for commercial use. They start with a highly pure precursor, work with a highly dilute solution, and/or are at a low volume and rate. The method of the present invention is highly suitable for economically attractive industrial scale production. According to a preferred embodiment, the method is operated at a production rate of at least 50 Kg/hour, more preferably at least 500 Kg/hour.

According to a preferred embodiment the pH of the solution drops during the process due to the hydrolysis of the titanic salt and thereby formation of an acid, e.g. sulfuric acid is achieved. Such acid is reused according to a preferred embodiment, e.g. for the formation of the titanic salt solution, e.g. in dissolution of a titanium-containing mineral. According to another preferred embodiment, the formed acid is partially or fully neutralized during the process, thereby forming a salt of the acid. According to a preferred embodiment, the salt is of industrial use, e.g., as in the case where neutralization is preformed with ammonia to form ammonium salts, which are suitable for use as fertilizers.

According to an alternative method, at least partially dehydrated small-size titanium oxide particles are formed. The method comprises the steps of preparing a starting aqueous solution comprising titanic ions or complexes thereof, at a concentration of at least 0.1% w/w titanium, which solution has pH of at least 0; preparing a modifying aqueous solution of a temperature greater than 80° C.; contacting the starting solution with the modifying solution to form a modified system and retaining the modified system at a temperature greater than 80° C. for at least 0.5 minute. The majority of the formed particles are between about 2 nm and about 500 nm in size and comprise titanic acid or $TiO_2$ or a combination thereof.

Preparing the starting solution may use methods similar to those described above. According to a preferred embodiment, the titanium concentration in said starting solution is greater than 2%. According to a preferred embodiment, the pH of the starting solution is at least 0, more preferred is a pH of at least 0.5. According to an alternative embodiment, the OH/Ti molar ratio in the starting solution is at least 0.05. According to a preferred embodiment, the temperature of the modifying solution is in the range between 100° C. and 300° C.

At least one of the starting solution and/or modifying solution comprises, according to a preferred embodiment, a reagent that is capable of interacting with titanic ions, their complexes, or with particles containing them. According to a preferred embodiment said reagent is a dispersant or a basic compound. Where used, the basic compound is preferably ammonia, ammonium carbonate, ammonium bicarbonate or urea. According to a preferred embodiment, basic pH is avoided in the modified system. Preferably, the OH/Ti molar ratio in the solution of said modified system is less than 3, more preferably between 0.5 and 4.

The temperature of the modified system is determined by the temperatures of the starting solution and of the hot modifying solution, by their heat capacity and by their relative amounts. According to a preferred embodiment, the temperature of the modified system is maintained with minimal change, e.g. with no changes in either direction that is greater than 20° C. According to a preferred embodiment the modified system is retained at that temperature for duration of between 1 and 30 minutes, more preferably between 3 and 15 minutes.

According to another preferred embodiment, the starting solution is maintained for a preliminary retention time before said contact with the modifying solution. Preferably, during the preliminary retention time, the solution is maintained at a temperature of less than 80° C. and at a pH greater than 0. According to a preferred embodiment, the duration of the preliminary retention time is sufficient for the production of 0.1 mmole protons per mmole of titanium present in solution, but does not exceed 14 days. In some cases in which the raw material is obtained in the form of aqueous solution with long retention time it can be used and will give a product with somewhat lower qualities.

According to a preferred embodiment, the particles formed in the process are subjected to steps selected from a group consisting of dispersing said particles, addition of a support, heat treatment, mixing, water evaporation, spray drying, thermal spraying and a combination thereof.

According to preferred embodiments of the present invention, the starting aqueous solution comprises at least one of titanic ions and complexes thereof, at a concentration of at least 0.1% w/w titanium.

A modifying aqueous solution of a temperature greater than 80° C. and the starting solution are contacted in a continuous mode in a mixing chamber to form a modified system.

The mixing chamber is built in a way to ensure quick and efficient mixing of the solutions. The modified system is removed from the mixing chamber in a plug-flow mode. During the plug flow, the precipitation is completed. In another preferred embodiment the solution is not exhausted during the plug flow time and the precipitation continues in another vessel.

The mixing in the mixing chamber is preferably carried out using the flow rate of the entering solution, by using mechanical mixing means or by another mode of mixing.

In one preferred embodiment, the temperature in the mixing chamber and during the plug flow are similar. In another preferred embodiment the temperature of the solution during the plug flow is higher than that in the mixing chamber and in yet another preferred embodiment the temperature of the solution during the plug flow is lower than that in the mixing chamber.

In a preferred embodiment of the present invention a solution containing a compound selected from the group consisting of an acid and a base is added to at least one of the solutions selected from the group consisting said starting solution, modifying solution and modified system.

In a preferred embodiment of the present invention, the residence time in a mixing chamber is less than about 5 minutes and more preferred is a residence time of less than 1 minute. In an even more preferred embodiment, the residence time in a mixing chamber is less than about 5 seconds and in an especially preferred embodiment the residence time is less than 0.5 second.

In preferred embodiments of the present invention the solution exiting the plug flow enters into a vessel. In a more preferred embodiment of the present invention the solution in the vessel is mixed.

In a preferred embodiment of the present invention the solution exiting the plug flow or the produced particles present in the solution exiting the plug flow are introduced into a crystallizer.

In another preferred embodiments of the present invention the temperature inside the crystallizer is kept in the range of about 100-300° C.

In preferred embodiments of the present invention a titanium salt solution is also introduced into a crystallizer.

In another preferred embodiments of the present invention titanic acid is also introduced into a crystallizer.

It will be evident to those skilled in the art that the invention is not limited to the details of the foregoing description and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for the formation of small-size titanium oxide particles, comprising the steps of:
    a) preparing a starting aqueous solution comprising at least one of titanic ions and complexes thereof, at a concentration of at least 0.1% w/w titanium;
    b) maintaining said solution at a temperature lower than 70° C. for a retention time in which hydrolysis takes place, the extent of said hydrolysis being sufficient to produce 0.1 mmol protons per mmol of titanium present in solution, wherein said time does not exceed 14 days, to form a system containing a retained solution; and c) adjusting the conditions in said system by at least one of the steps of:
   i) heating the retained solution to elevate the temperature thereof by at least 1° C.;
   ii) changing the pH of the retained solution by at least 0.1 units; and
   iii) diluting the retained solution by at least 20%;
whereby there are formed particles, wherein the particles are formed at a rate of at least 50 Kg/hour, the majority of the particles formed are between about 2 nm and about 500 nm in size and optionally dehydrating said formed particles at a calcination temperature in a range of between about 90° C. and about 900° C. to form dehydrated particles.

2. A method according to claim 1, wherein the solution is maintained at said adjusted conditions for at least 0.5 minute.

3. A method according to claim 1, further characterized in that the majority of the formed particles have a degree of crystallinity of more than 50% and wherein said particles are selected from the group consisting of anatase, rutile or brookite.

4. A method according to claim 1 further characterized in that the size ratio between the smallest and largest particle or dehydrated particles of the mean 50% (by weight) of the formed particles is less than about 5.

5. A method according to claim 1, further comprising said dehydration step and wherein adjusting involves heating to calcination temperature, and said dehydration step and said adjusting step are conducted simultaneously.

6. A method according to claim 1, wherein said oxide has the formula selected from a group consisting of $TiO_2$ and $Ti(OH)_4$.

7. A method according to claim 1, wherein the titanium concentration in the starting aqueous solution is greater than about 5 wt %.

8. A method according to claim 1, wherein the pH of the solution is less than 5 during at least 80% of the process duration and wherein the pH of the solution in step (b) is kept between about 0 and about 2.5 during at least a fraction of the duration of step (b).

9. A method according to claims 1, wherein at least one dispersant is present in at least one step of a group consisting of preparing, maintaining, adjusting, dehydrating and grinding, wherein said dispersant is selected from a group consisting of cationic polymers, anionic polymers, nonionic polymers, surfactants, and mixtures thereof and wherein optionally the process further comprising the step of modifying the amount of said dispersant.

10. A method according to claim 1, wherein the starting solution is treated by at least one of the following actions of ultrasound and microwaving.

11. The titanium oxide particles whenever formed according to the method of claim 1, and a preparation comprising them.

12. A method comprising using at least one of said particles and said preparation according to claim 11 for at least one of pigment, catalyst and coating.

13. A method for the formation of small-size titanium oxide particles, comprising the steps of:
   a) preparing a starting aqueous solution comprising at least one of titanic ions and complexes thereof, at a concentration of at least 0.1% w/w titanium, which solution has a pH lower than 2;
   b) preparing a modifying aqueous solution;
   c) contacting the starting solution with the modifying solution in a continuous mode in a mixing chamber to form a modified system;
   d) removing the modified system from the mixing chamber in a plug-flow mode; and
which method is characterized in that:
   i) the residence time in the mixing chamber is less than about 5 minutes;
   ii) there are formed particles or aggregates thereof, wherein the majority of the particles formed are between about 2 nm and about 500 nm in size;
   iii) the formed particles comprise titanic acid or $TiO_2$ or a combination thereof; and
   iv) the temperature of the modifying solution is in the range between 100° C. and 300° C.

14. A method according to claim 13, wherein the conditions in said system are adjusted by the modifying solution by at least one of the conditions of:
   heating said starting aqueous solution by at least 10° C.;
   changing the pH of said starting aqueous solution by at least 0.1 units;
   and
   diluting the starting aqueous solution by at least 20%;
or a combination thereof, wherein said modified system is maintained at said adjusting conditions for at least 0.5 minutes.

15. A method according to claim 13, wherein the titanium concentration in said starting solution is greater than 2 wt %.

16. A method according to claim 13, wherein at least one of said starting solution and said modifying solution comprise a reagent selected from a group of dispersants and basic compounds.

17. A method according to claim 13, wherein the modified system is retained for a duration of between 1 and 60 minutes and wherein during said retaining, the temperature is maintained within less than 20° C. change in either direction from the temperature of the modified system.

18. A method according to claim 13, further comprising a step of retaining the prepared starting aqueous solution before said contacting at a temperature of less than 80° C. and pH greater than 0 for a preliminary retention time sufficient for the production of 0.1 mmol protons per mmol of titanium present in solution, wherein said preliminary retention time does not exceed 14 days.

19. A method according to claim 13, where the residence time in the mixing chamber is less than about 5 seconds.

20. Titanium oxide particles whenever formed according to the method of claim 13, and a preparation comprising them.

21. The titanium oxide particles of claim 20, characterized in that the purity of the titanium oxide particles with regard to other metals intermixed therewith, is of at least 95%.

22. The titanium oxide particles of claim 20, characterized in that said particles are doped with atoms of other compounds.

23. A preparation according to claim 20, wherein said particles are dispersed in a liquid, supported on a solid compound, agglomerated to larger particles, partially fused, coated, or any combination thereof.

24. A method according to claim 13, wherein the removed modified system or the particles in it are introduced into a crystallizer, wherein optionally also introduced is at least one of titanium salt and titanic acid and wherein the temperature inside the crystallizer is kept in the range of about 100-300° C.

25. A method according to claim 24 wherein a reagent selected from a group consisting of a dispersant and a basic compound, is present in at least one step of a group consisting of preparing, maintaining, adjusting, crystallizing in said crystallizer, and flowing in said plug-flow mode.

* * * * *